(12) United States Patent
Yu et al.

(10) Patent No.: US 10,917,617 B2
(45) Date of Patent: Feb. 9, 2021

(54) TUNNEL DEFORMATION MONITORING SYSTEM

(71) Applicant: SHENZHEN MUNICIPAL DESIGN & RESEARCH INSTITUTE CO., LTD., Guangdong (CN)

(72) Inventors: Haizhong Yu, Guangdong (CN); Shuya Liu, Guangdong (CN); Hong Chen, Guangdong (CN); Jianxin Wang, Guangdong (CN); Tianxiao Wang, Guangdong (CN)

(73) Assignee: SHENZHEN MUNICIPAL DESIGN & RESEARCH INSTITUTE CO., LTD., Guangdong (CN)

( * ) Notice: Subject to any disclaimer, the term of this patent is extended or adjusted under 35 U.S.C. 154(b) by 0 days.

(21) Appl. No.: 16/482,153

(22) PCT Filed: Sep. 28, 2018

(86) PCT No.: PCT/CN2018/108267
§ 371 (c)(1),
(2) Date: Jul. 30, 2019

(87) PCT Pub. No.: WO2020/000740
PCT Pub. Date: Jan. 2, 2020

(65) Prior Publication Data
US 2020/0077051 A1    Mar. 5, 2020

(30) Foreign Application Priority Data

Jun. 29, 2018   (CN) .......................... 2018 1 0693432

(51) Int. Cl.
*H04N 7/18* (2006.01)
*G01B 11/14* (2006.01)
(Continued)

(52) U.S. Cl.
CPC ............. *H04N 7/183* (2013.01); *G01B 11/14* (2013.01); *G01B 11/16* (2013.01); *H04N 5/23206* (2013.01)

(58) Field of Classification Search
CPC ...................................................... H04N 7/183
(Continued)

(56) References Cited

U.S. PATENT DOCUMENTS

| 7,997,130 B1 * | 8/2011 | Stonner | G01M 9/04 73/147 |
| 9,625,253 B2 * | 4/2017 | Stewart | G06T 7/75 |

(Continued)

FOREIGN PATENT DOCUMENTS

| CN | 201402125 Y | 2/2010 |
| CN | 101936714 A | 1/2011 |

(Continued)

*Primary Examiner* — Leron Beck
(74) *Attorney, Agent, or Firm* — Berenato & White, LLC

(57) ABSTRACT

The present invention discloses a tunnel deformation monitoring system, which includes: a laser distance measuring instrument, disposed on a side wall of a maximum horizontal width of a tunnel, and configured to measure the width of a cross section of the tunnel; a surveillance camera, disposed on the laser distance measuring instrument, and configured to view the scene of the tunnel; a control and transmission device, configured to receive a control command and control the laser distance measuring instrument and the surveillance camera, and receive monitoring data of the laser distance measuring instrument and video data acquired by the surveillance camera; and a remote control terminal, configured to send a control command to the control and transmission device, receive the monitoring data and the video data, and analyze and display the monitoring data and the video data.

7 Claims, 2 Drawing Sheets

(51) Int. Cl.
  *G01B 11/16* (2006.01)
  *H04N 5/232* (2006.01)

(58) Field of Classification Search
  USPC .......................................... 348/135
  See application file for complete search history.

(56) References Cited

U.S. PATENT DOCUMENTS

| | | | |
|---|---|---|---|
| 2008/0177482 A1* | 7/2008 | Kishida | G01K 7/427 |
| | | | 702/35 |
| 2010/0302369 A1* | 12/2010 | Monsive, Jr. | G08B 13/19632 |
| | | | 348/148 |
| 2013/0059572 A1* | 3/2013 | Davis | H04M 3/42042 |
| | | | 455/415 |
| 2014/0118554 A1* | 5/2014 | Bucknor | G06K 9/00362 |
| | | | 348/155 |
| 2014/0125801 A1* | 5/2014 | Zhu | G01M 5/0025 |
| | | | 348/143 |
| 2017/0144682 A1* | 5/2017 | Kamei | G01B 21/16 |
| 2018/0005043 A1* | 1/2018 | Boss | G06K 9/4661 |
| 2018/0038683 A1* | 2/2018 | Yuan | G01C 7/06 |

FOREIGN PATENT DOCUMENTS

| | | |
|---|---|---|
| CN | 104048970 A | 9/2014 |
| CN | 104329120 A | 2/2015 |
| CN | 205825910 U | 12/2016 |
| CN | 206990576 U | 2/2018 |
| CN | 208269843 U | 12/2018 |

\* cited by examiner

TUNNEL DEFORMATION MONITORING SYSTEM

CROSS-REFERENCE TO RELATED APPLICATIONS AND CLAIM TO PRIORITY

This application is a national stage application of International Application No. PCT/CN2018/108267 filed Sep. 28, 2018, which claims priority to the Chinese Patent Application No. 201810693432.3, filed with the National Intellectual Property Administration, PRC on Jun. 29, 2018, and entitled "TUNNEL DEFORMATION MONITORING SYSTEM", the entire contents of which are incorporated herein by reference.

TECHNICAL FIELD

The present invention relates to the field of subway tunnel monitoring, and in particular to a tunnel deformation monitoring system.

BACKGROUND

Laser distance measuring is performed by using a laser as a light source, supplemented by video surveillance to view the scene. According to the way the laser works, the laser is divided into a continuous laser and a pulsed laser. Gas lasers such as helium-neon, argon ion, and krypton-cadmium lasers are operated in a continuous output state and used for phase laser distance measuring; a double heterogeneous gallium arsenide semiconductor laser is used for infrared distance measuring; and solid lasers such as ruby and neodymium glass lasers are used for pulsed laser distance measuring. Due to the characteristics of good monochromaticity and strong directionality and the like of laser, as well as electronic circuit semiconductorization and integration, compared with an electro-optical distance measuring instrument, a laser distance measuring instrument can not only be operated day and night, but also improve distance measurement accuracy and significantly reduce the weight and power consumption, making the measurement of distances from far targets such as an artificial earth satellite and moon become a reality.

The principle of visible laser distance measuring is the same as that of radio radar, that is, after the laser is aligned with a target and transmitted, the round-trip time thereof is measured, and then multiplied by the speed of light to get the round-trip distance. At present, the accuracy of short-range laser distance measuring can reach +/−1 mm, which can be used for monitoring structural deformation. However, the current laser distance measuring instrument has a single function, mainly for distance measuring, and there are few visual laser distance measuring instruments combined with video surveillance.

At present, tunnel monitoring is mainly carried out by a full automatic total station (using laser distance measuring). The deformation of the tunnel is calculated by measuring coordinate changes of monitoring points. One total station can monitor hundreds of monitoring points, each time measuring tens of points; each point needs to be measured for a few round trips, and one-time monitoring takes 1 hour to several hours. In addition, monitoring results also need to be adjusted, generally for daily automated monitoring. The monitoring frequency is generally 1 or 2 times a day. For the grouting reinforcement inside and outside the tunnel, the change of grouting pressure and the like will affect the tunnel within a few minutes. It is required to promptly and quickly reflect the tunnel deformation, and check the scene environment in real time. At this time, the total station monitoring is difficult to meet the requirements of real-time monitoring.

SUMMARY

An objective of the present invention is to provide a tunnel deformation monitoring system, which can be used to focus on monitoring and measuring the deformation of any fixed point position, and is simple, convenient and flexible.

To achieve the above purpose, the present invention provides the following technical solution.

A tunnel deformation monitoring system includes:
a laser distance measuring instrument, disposed on a side wall of a maximum horizontal width of a tunnel, and configured to measure the width of a cross section of the tunnel;
a surveillance camera, disposed on the laser distance measuring instrument, and configured to view the scene of the tunnel;
a control and transmission device, configured to receive a control command and control the laser distance measuring instrument and the surveillance camera, and receive monitoring data of the laser distance measuring instrument and video data acquired by the surveillance camera; and
a remote control terminal, configured to send a control command to the control and transmission device, receive the monitoring data and the video data, and analyze and display the monitoring data and the video data.

Optionally, the monitoring system further includes a data server, connected to the remote control terminal, and configured to store and manage data.

Optionally, the laser distance measuring instrument, the surveillance camera and the control and transmission device form an integrated device.

Optionally, the remote control terminal is a computer or a mobile phone.

Optionally, the control and transmission device and the remote control terminal perform wireless transmission.

Optionally, a phone card is disposed in the control and transmission device.

Optionally, the monitoring data transmission uses a 2/3/4G signal of mobile communication, and the video data transmission uses a 4G signal of mobile communication.

According to specific embodiments provided in the present invention, the present invention discloses the following technical effects:

The monitoring system provided by the present invention can be installed on a subway tunnel structure, to monitor an area that needs to be focused on, and to monitor the scene environment in real time. Monitoring data is acquired automatically through remote control and automatically sent back to a server background, and the monitoring data can be accessed and controlled by a computer or a mobile phone, to display the monitoring data in real time. An over-limit alarm can be made. The installation thereof is simple and convenient. The system can be automatically operated 24 hours a day, and the data can be acquired once every 5 seconds, which greatly improves the work efficiency and ensures the safety of the subway operation tunnel.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF EMBODIMENTS

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

To make objectives, features, and advantages of the present invention more comprehensible, the following describes the present invention in more detail with reference to accompanying drawings and specific implementations.

Embodiment 1

Figure 1:
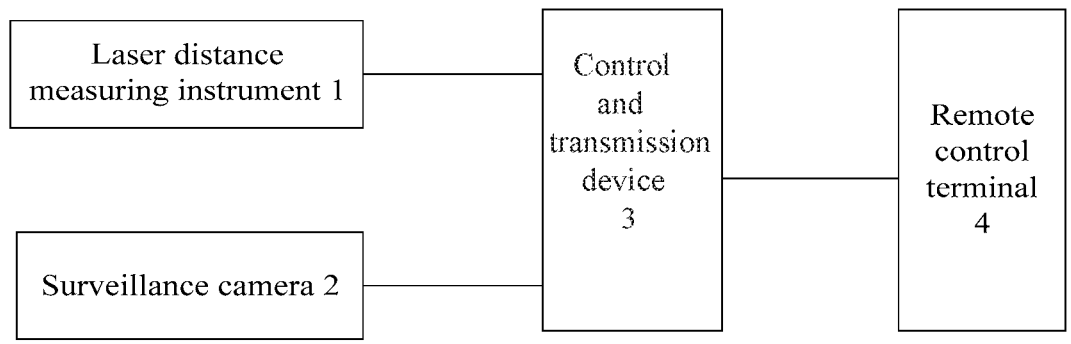
FIG. 1 is a structural connection diagram of a tunnel deformation monitoring system according to Embodiment 1 of the present invention.

FIG. 1 is a structural connection diagram of a tunnel deformation monitoring system according to Embodiment 1 of the present invention. As shown in FIG. 1, the tunnel deformation monitoring system includes a laser distance measuring instrument 1, a surveillance camera 2, a control and transmission device 3, and a remote control terminal 4.

Figure 2:
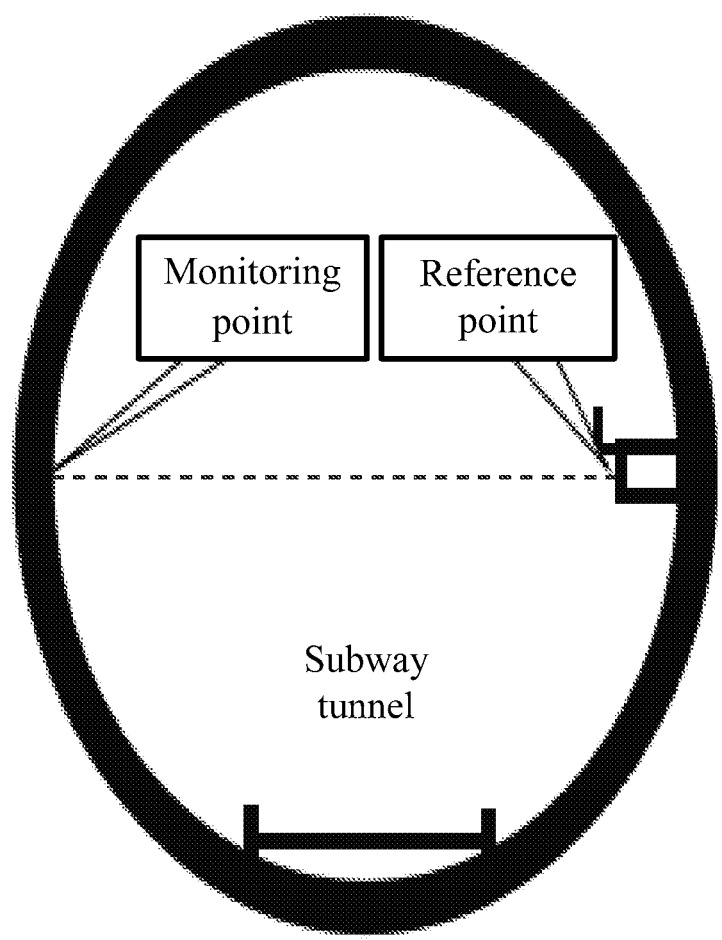
FIG. 2 is a positional view of a laser distance measuring instrument in a subway tunnel according to the present invention.

The laser distance measuring instrument 1 is disposed on a side wall of a maximum horizontal width of a tunnel, and configured to measure the width of a cross section of the tunnel. FIG. 2 is a positional view of a laser distance measuring instrument in a subway tunnel according to the present invention. As shown in FIG. 2, the laser distance measuring instrument 1 is mounted on the side wall of the maximum horizontal width of the tunnel. A laser transceiving window (a window that reflects laser and receives laser reflected back from the opposite side, similar to a muzzle) is aligned with a symmetric point position on the opposite side of the tunnel, so that a connecting line between the laser transceiving window and a laser head is in the tunnel diameter direction. After installation, the distance between the side wall of the tunnel and the laser distance measuring reference point is measured, and input into control software as an offset correction amount, so that the measured distance is the true maximum horizontal width value of the tunnel. Since the maximum width represents the diameter of the tunnel, a standard tunnel is generally 5400 mm, which facilitates comparisons with design values.

The surveillance camera 2 is disposed on the laser distance measuring instrument, and configured to view the scene of the tunnel, to provide references for analyzing changes and abnormal conditions of monitoring data, and provide assistance for emergency rescue when necessary. For example, if the monitoring data exceeds the standard, there are two cases, one is that the structural deformation exceeds the standard, and the other is that the instrument is displaced by the touch, which leads to changes in measurement point position, thereby exceeding the standard. At this time, whether the laser measurement position is the original point position can be found through the video monitoring. If the point position does not change, it indicates that the structure is really deformed, and an alarm can be made.

The control and transmission device 3 is configured to receive a remote command and control the laser distance measuring instrument and the surveillance camera, and receive monitoring data of the laser distance measuring instrument and video data acquired by the surveillance camera; where the control instruction includes: controlling when to start measuring, how long the measurement interval is, controlling when the surveillance camera 2 is turned on, whether the surveillance camera 2 takes a picture or a video, how to perform transmission, and the like.

The remote control terminal 4 is configured to send a control command to the control and transmission device, receive the monitoring data and the video data, and analyze and display the monitoring data and the video data.

The monitoring system provided in this embodiment can be installed on the subway tunnel structure to monitor areas that need to be focused on.

Embodiment 2

Figure 3:
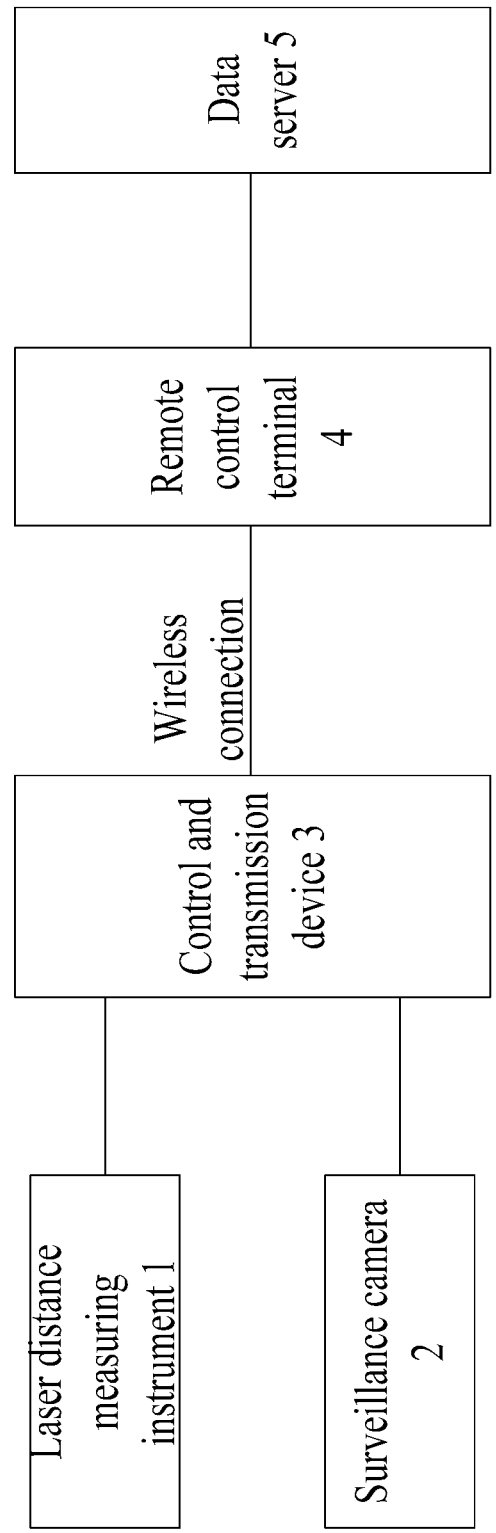
FIG. 3 is a structural connection diagram of a tunnel deformation monitoring system according to Embodiment 2 of the present invention.

FIG. 3 is a structural connection diagram of a tunnel deformation monitoring system according to Embodiment 2 of the present invention. As shown in FIG. 3, the tunnel deformation monitoring system includes a laser distance measuring instrument 1, a surveillance camera 2, a control and transmission device 3, a remote control terminal 4, and a data server 5.

The laser distance measuring instrument 1 is disposed on a side wall of a maximum horizontal width of a tunnel, and configured to measure the width of a cross section of the tunnel.

The surveillance camera 2 is disposed on the laser distance measuring instrument 1, and configured to view the scene of the tunnel.

The control and transmission device 3 is configured to receive a remote command and control the laser distance measuring instrument 1 and the surveillance camera 2, and receive monitoring data of the laser distance measuring instrument and video data acquired by the surveillance camera. A phone card is disposed in the control and transmission device 3.

The laser distance measuring instrument 1, the surveillance camera 2 and the control and transmission device 3 form an integrated device.

The remote control terminal 4 is configured to send a control command to the control and transmission device 3, receive the monitoring data and the video data, and analyze and display the monitoring data and the video data. The remote control terminal 4 is a computer or a mobile phone.

The data server 5 is connected to the remote control terminal 4, and configured to store and manage data.

The control and transmission device 3 and the remote control terminal 4 perform wireless transmission. The monitoring data transmission uses a 2/3/4G signal of mobile communication, and the monitoring video transmission uses a 4G signal of mobile communication.

Once the control and transmission device 3 is started, the data can be automatically acquired and transmitted to the data server 5 without manual intervention. The remote control terminal 4 can be opened for viewing at any time, or can be terminated at any time, and can be restarted after acquisition parameters are modified. The acquisition parameters include: an acquisition interval, an initial value and a date thereof, and the offset between the position to start counting of the laser head and the side wall.

The working principle and process of the tunnel deformation monitoring system according to the present invention are as follows:

First, the data server 5 runs data transceiving management software to be in a listening state, and the integrated device of the laser distance measuring instrument 1, the surveillance camera 2 and the control and transmission device 3 is installed on the site, and a mobile phone card is disposed in the control and transmission device 3. After the power is switched on, a monitoring device can be set on the site through the remote control terminal 4 (a notebook computer). The monitoring device can be automatically operated after parameters such as a server address, a data port, and acquisition frequency are set. Data acquired by the laser distance measuring instrument 1 is automatically stored to the server 5 through the control and transmission device 3. The remote control terminal 4 is divided into a control version and a display version. The control version is used by authorized technicians to start, stop, and change parameters. The display version can be provided to monitoring staff, owners, supervisors, construction units and other users, and the monitoring data can be viewed in real time, but the monitoring device cannot be controlled.

The advantages of the tunnel deformation monitoring system according to the present invention are as follows:

(1) The whole device is very simple, convenient and flexible and can be installed in any position in the tunnel that does not affect the driving. The device can monitor and measure the deformation of any fixed point, and the precision can reach +/−1 mm.

(2) The laser distance measuring instrument, the camera and the control and transmission device are integrated into one, which avoids the cumbersome work of wiring and eliminates equipment failure caused by unsmooth connection. The device can work as long as the power is switched on. If no power is available on the site, the device can also be powered by a battery, and the power consumption is small. The device can also work for more than a week when powered by the battery.

(3) When the monitoring data has an alarm or an abnormal situation, a video signal can be turned on to check the surrounding conditions and whether a laser distance measuring light spot is deviated from a monitoring target, so that the cause of the change and abnormal condition of the monitoring data is grasped in time.

(4) Video surveillance and laser distance measuring functions can be controlled separately and are enabled separately or simultaneously.

(5) In order to save 4G traffic, the video surveillance content can be stored locally, and the storage time can be more than one month.

(6) Laser distance measuring data is transmitted as a priority, and measurement results can be quickly transmitted even if only 2G signals are available.

(7) Once the device is started, the device can be automatically operated. The data can be acquired once every 5 seconds. The monitoring data can be displayed in real time and can also be automatically stored, and historical data can be arbitrarily accessed.

(8) Monitoring and analysis software can be installed in a mobile phone terminal. When tunnel grouting and other projects need timely on-site guidance and construction, the device can be carried with you.

(9) The device is low in cost and suitable for mass installation. Only one server is needed. If there is no special requirement for data confidentiality, a cloud server can also be used.

(10) When two instruments are adopted for opposite measurement, since each instrument has a camera, the instruments can monitor the conditions of each other and can play the role of anti-theft.

(11) Assistance can be provided for emergency rescue when necessary.

Each embodiment of the present specification is described in a progressive manner, each embodiment focuses on the difference from other embodiments, and the same and similar parts between the embodiments may refer to each other.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A tunnel deformation monitoring system, installed on a subway tunnel structure to monitor areas that need to be focused on, comprising:

a laser distance measuring instrument, disposed on a side wall of a maximum horizontal width of a tunnel, and configured to measure the width of a cross section of the tunnel;

a laser transceiving window, aligned with a symmetric point position on the opposite side of the tunnel, so that a connecting line between the laser transceiving window and a laser head is in the tunnel diameter direction; after installation, the distance between the side wall of the tunnel and the laser distance measuring reference point is measured, and input into control software as an offset correction amount, so that the measured distance is the true maximum horizontal width value of the tunnel;

a surveillance camera, disposed on the laser distance measuring instrument, and configured to view the scene of the tunnel, to provide references for analyzing changes and abnormal conditions of monitoring data; if the monitoring data exceeds the standard, there are two cases, one is that the structural deformation exceeds the standard, and the other is that the instrument is displaced by the touch, which leads to changes in measurement point position, thereby exceeding the standard; at this time, whether the laser measurement position is the original point position can be found through the video monitoring; if the point position does not change, it indicates that the structure is really deformed, and an alarm can be made;

a control and transmission device, configured to receive a control command and control the laser distance measuring instrument and the surveillance camera, and receive monitoring data of the laser distance measuring instrument and video data acquired by the surveillance camera; where a control instruction includes controlling when the surveillance camera is turned on; and a remote control terminal, configured to send a control command to the control and transmission device, receive the monitoring data and the video data, and analyze and display the monitoring data and the video data.

2. The tunnel deformation monitoring system according to claim 1, further comprising: a data server, connected to the remote control terminal, and configured to store and manage data.

3. The tunnel deformation monitoring system according to claim 1, wherein the laser distance measuring instrument, the surveillance camera and the control and transmission device form an integrated device.

4. The tunnel deformation monitoring system according to claim 1, wherein the remote control terminal is a computer or a mobile phone.

5. The tunnel deformation monitoring system according to claim 1, wherein the control and transmission device and the remote control terminal perform wireless transmission.

6. The tunnel deformation monitoring system according to claim 5, wherein a phone card is disposed in the control and transmission device.

7. The tunnel deformation monitoring system according to claim 6, wherein the monitoring data transmission uses a 2/3/4G signal of mobile communication, and the video data transmission uses a 4G signal of mobile communication.

* * * * *